(12) United States Patent
Wu et al.

(10) Patent No.: US 11,057,223 B2
(45) Date of Patent: Jul. 6, 2021

(54) ANTI-COUNTERFEIT COMMUNICATION SYSTEM

(71) Applicant: eMemory Technology Inc., Hsin-Chu (TW)

(72) Inventors: Meng-Yi Wu, Hsinchu County (TW); Hsin-Ming Chen, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 349 days.

(21) Appl. No.: 16/157,098

(22) Filed: Oct. 11, 2018

(65) Prior Publication Data

US 2019/0165955 A1   May 30, 2019

Related U.S. Application Data

(60) Provisional application No. 62/590,402, filed on Nov. 24, 2017.

(51) Int. Cl.
*H04L 29/00* (2006.01)
*H04L 9/32* (2006.01)
(Continued)

(52) U.S. Cl.
CPC ........ *H04L 9/3278* (2013.01); *G11C 11/5621* (2013.01); *G11C 16/0483* (2013.01);
(Continued)

(58) Field of Classification Search
CPC ............... H04L 9/3278; G11C 11/5621; G11C 16/0483
(Continued)

(56) References Cited

U.S. PATENT DOCUMENTS 9,680,643 B2   6/2017 Meyer
2008/0279373 A1*  11/2008 Erhart .................. H04L 9/3278
380/46
(Continued)

FOREIGN PATENT DOCUMENTS

CN   103748828 A   4/2014
CN   107169377 A   9/2017
(Continued)

OTHER PUBLICATIONS

Basel Halak et al., Overview of PUF-Based Hardware Security Solutions for the Internet of Things, 2016 IEEE 59th International Midwest Symposium on Circuits and Systems (MWSCAS), Oct. 16-19, 2016, Abu Dhabi, UAE.

*Primary Examiner* — Morshed Mehedi
*Assistant Examiner* — Michael D Anderson
(74) *Attorney, Agent, or Firm* — Winston Hsu

(57) ABSTRACT

The communication system includes a communication buffer and a communication terminal. The communication buffer includes a physical unclonable function (PUF) device, and the communication buffer provides a security key generated by the PUF device. The communication terminal is coupled to the communication buffer, and transmits a mapping request to the communication buffer to ask for the security key. The communication terminal manipulates the transmission data with the security key to generate the encrypted data, and transmits the encrypted data to the communication buffer. The communication buffer further restores the transmission data from the encrypted data according to the security key.

21 Claims, 5 Drawing Sheets

(51) Int. Cl.
*H04L 9/08* (2006.01)
*H04L 9/30* (2006.01)
*H04L 29/06* (2006.01)
*G11C 11/56* (2006.01)
*G11C 16/04* (2006.01)
*H01L 27/11524* (2017.01)
*H01L 29/06* (2006.01)
*H01L 29/423* (2006.01)
*H01L 29/49* (2006.01)
*H02H 9/04* (2006.01)

(52) U.S. Cl.
CPC .... *H01L 27/11524* (2013.01); *H01L 29/0649* (2013.01); *H01L 29/42328* (2013.01); *H01L 29/4916* (2013.01); *H02H 9/046* (2013.01); *H04L 9/0866* (2013.01); *H04L 9/0877* (2013.01); *H04L 9/3073* (2013.01); *H04L 63/062* (2013.01)

(58) Field of Classification Search
USPC .......................................................... 380/44
See application file for complete search history.

(56) References Cited

U.S. PATENT DOCUMENTS

| | | |
|---|---|---|
| 2013/0051552 A1 | 2/2013 | Handschuh |
| 2013/0254636 A1* | 9/2013 | Kirkpatrick ........... H04L 9/0866 714/784 |
| 2014/0218067 A1* | 8/2014 | Li .......................... G09C 1/00 326/8 |
| 2016/0006570 A1 | 1/2016 | Falk |
| 2017/0005811 A1 | 1/2017 | Tremlet |
| 2017/0126414 A1 | 5/2017 | Goel |
| 2017/0134176 A1 | 5/2017 | Kim |
| 2017/0200508 A1 | 7/2017 | Grigoriev |

FOREIGN PATENT DOCUMENTS

| | | |
|---|---|---|
| JP | 2016-86337 A | 5/2016 |
| JP | 2017-514421 A | 6/2017 |
| JP | 2017-130184 A | 7/2017 |
| KR | 10-1488433 B1 | 2/2015 |
| TW | 200924478 | 6/2009 |
| TW | 201701186 A | 1/2017 |
| WO | 2009/005089 A1 | 1/2009 |
| WO | 2017/021254 A1 | 2/2017 |

* cited by examiner

ANTI-COUNTERFEIT COMMUNICATION SYSTEM

CROSS REFERENCE TO RELATED APPLICATIONS

This non-provisional application claims priority of U.S. provisional application No. 62/590,402, filed on Nov. 24, 2017, included herein by reference in its entirety.

BACKGROUND OF THE INVENTION

1. Field of the Invention

The present invention is related to a communication system, and more particularly, to an anti-counterfeit communication system.

2. Description of the Prior Art

As the function of electronic devices become more complicated, the electronic devices usually include blocks and chips with different functions. However, if the behavior of a chip can be recorded and analyzed during the communications with other chips by a competitor, then the competitor will be able replace the chip with their own product by simulating the behavior of the chip. The issue of exposure of sensitive information is even more apparent in the area of the Internet of Things (IoT) when chips and/or blocks designed by different companies have to communicate with each other. Moreover, if the chip in a host terminal has been replaced, the counterfeit chip may even take control of other client devices in the IoT system, causing chaos to the system.

To prevent this issue, authentication for communications between chips or blocks is usually required. However, in prior art, since the authentication behavior is rather simple and only performed in the initial state of the communications, it can still be predicted and simulated.

SUMMARY OF THE INVENTION

One embodiment of the present invention discloses a communication system. The communication system includes a communication buffer and a communication terminal.

The communication buffer includes a physical unclonable function (PUF) device, and the communication buffer provides a security key generated by the PUF device. The communication terminal is coupled to the communication buffer, and transmits a mapping request to the communication buffer to ask for the security key. The communication terminal manipulates the transmission data with the security key to generate the encrypted data, and transmits the encrypted data to the communication buffer. The communication buffer further restores the transmission data from the encrypted data according to the security key.

Another embodiment of the present invention discloses a communication system. The communication system includes a communication buffer and a communication terminal.

The communication buffer includes a physical unclonable function (PUF) device. The communication buffer provides a security key generated by the PUF device, and manipulates the transmission data with the security key to generate encrypted data. The communication terminal is coupled to the communication buffer. The communication terminal transmits a mapping request to the communication buffer to ask for the security key, restores the transmission data from the encrypted data according to the security key, and performs a corresponding function according to the transmission data.

Another embodiment of the present invention discloses a method for operating a communication system. The communication system includes communication buffer and a communication terminal.

The method includes the communication terminal transmitting a mapping request to the communication buffer, the communication buffer providing a security key generated by a PUF device in the communication buffer when the mapping request is received, the communication terminal retrieving the security key from the communication buffer, the communication terminal manipulating transmission data with the security key to generate encrypted data, the communication terminal transmitting the encrypted data to the communication buffer, and the communication buffer restoring the transmission data according to the encrypted data and the security key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
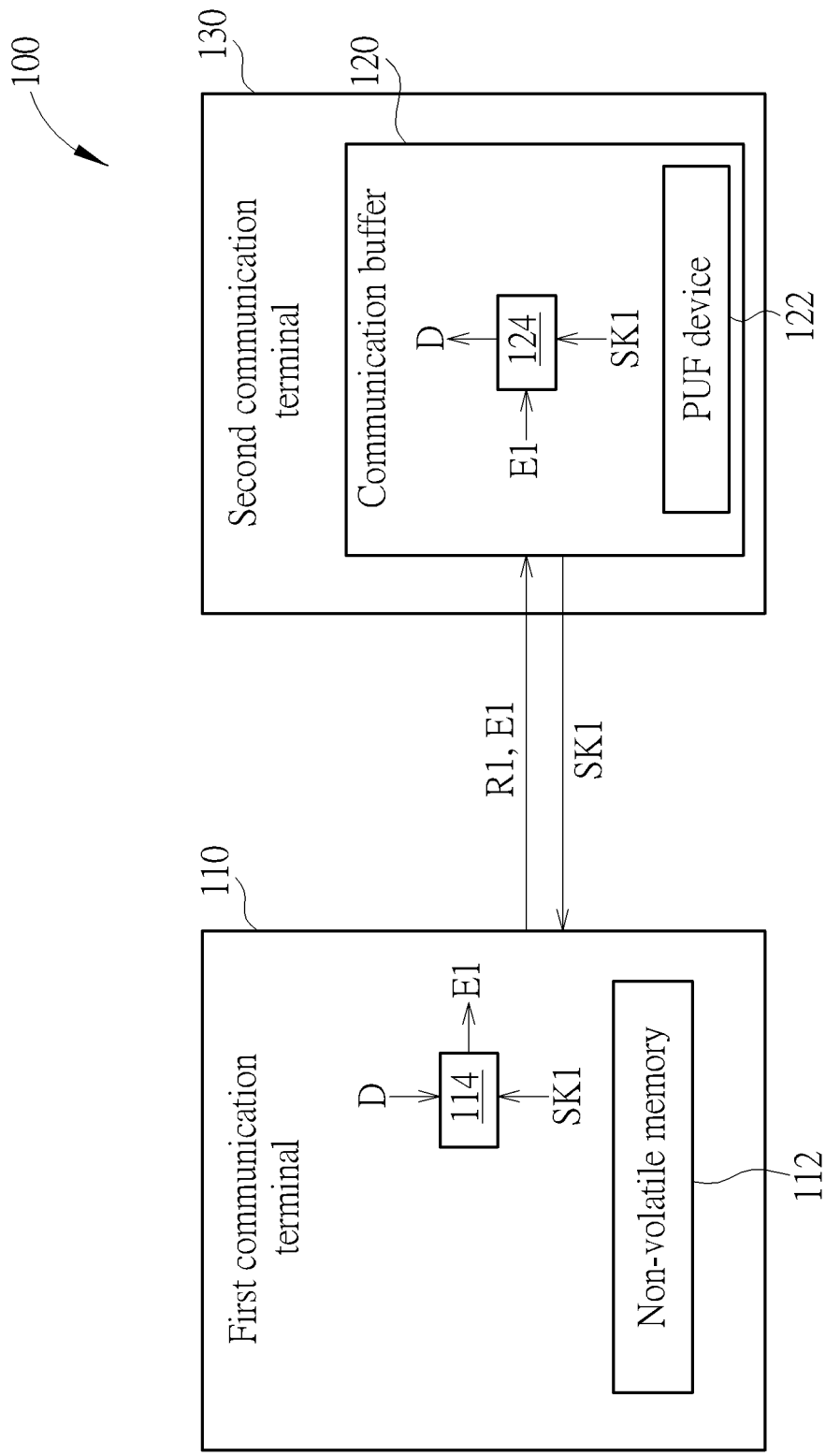
FIG. 1 shows a communication system according to one embodiment of the present invention.

FIG. 1 shows a communication system 100 according to one embodiment of the present invention. The communication system 100 includes a first communication terminal 110, and a communication buffer 120.

The communication buffer 120 includes a physical unclonable function (PUF) device 122, and can provide a first security key SK1 generated by the PUF device 122. The PUF device 122 can include a plurality of PUF units, and each of the PUF units can generate a bit of data according to its uncontrollable random physical characteristics generated in the manufacturing process. The process variations can come from very small changes in process control, material contents, and/or environmental drift. These unavoidable and unpredictable variations are amplified by the PUF units, and the PUF device 122 can use the bits of data generated by the PUF units to form a first security key SK1 for protecting the communication in the communication system 100.

The first communication terminal 110 is coupled to the communication buffer 120, and can transmit a first mapping request R1 to the communication buffer 120 to ask for the first security key SK1. Afterwards, the first communication terminal 110 can manipulate its transmission data D with the first security key SK1 to generate first encrypted data E1, and transmit the first encrypted data E1 to the communication buffer 120. The communication buffer 120 can restore the transmission data D from the first encrypted data E1 according to the first security key SK1. That is, without the security key SK1 provided by the communication buffer 120, the transmission data D hidden in the encrypted data E1 cannot be retrieved. Therefore, the transmission data D can be protected during the communication.

In some embodiments, the transmission data D can be the information required by other terminals or commands for controlling other terminals. That is, the transmission data D can be transmitted through the IO buses of the first communication terminal 110. For example, in FIG. 1, the communication system 100 further includes a second communication terminal 130 coupled to the communication buffer 120. The second communication terminal 130 can receive the transmission data D from the communication buffer 120 and perform a corresponding function according to the transmission data D. In addition, in FIG. 1, the communication buffer 120 can be embedded in the second communication terminal 130 so that the transmission data D can be transmitted internally between the communication buffer 120 and second communication terminal 130, protecting the transmission data D from being exposed during communications. Consequently, the communications on the IO buses can be encrypted and protected.

Figure 2:
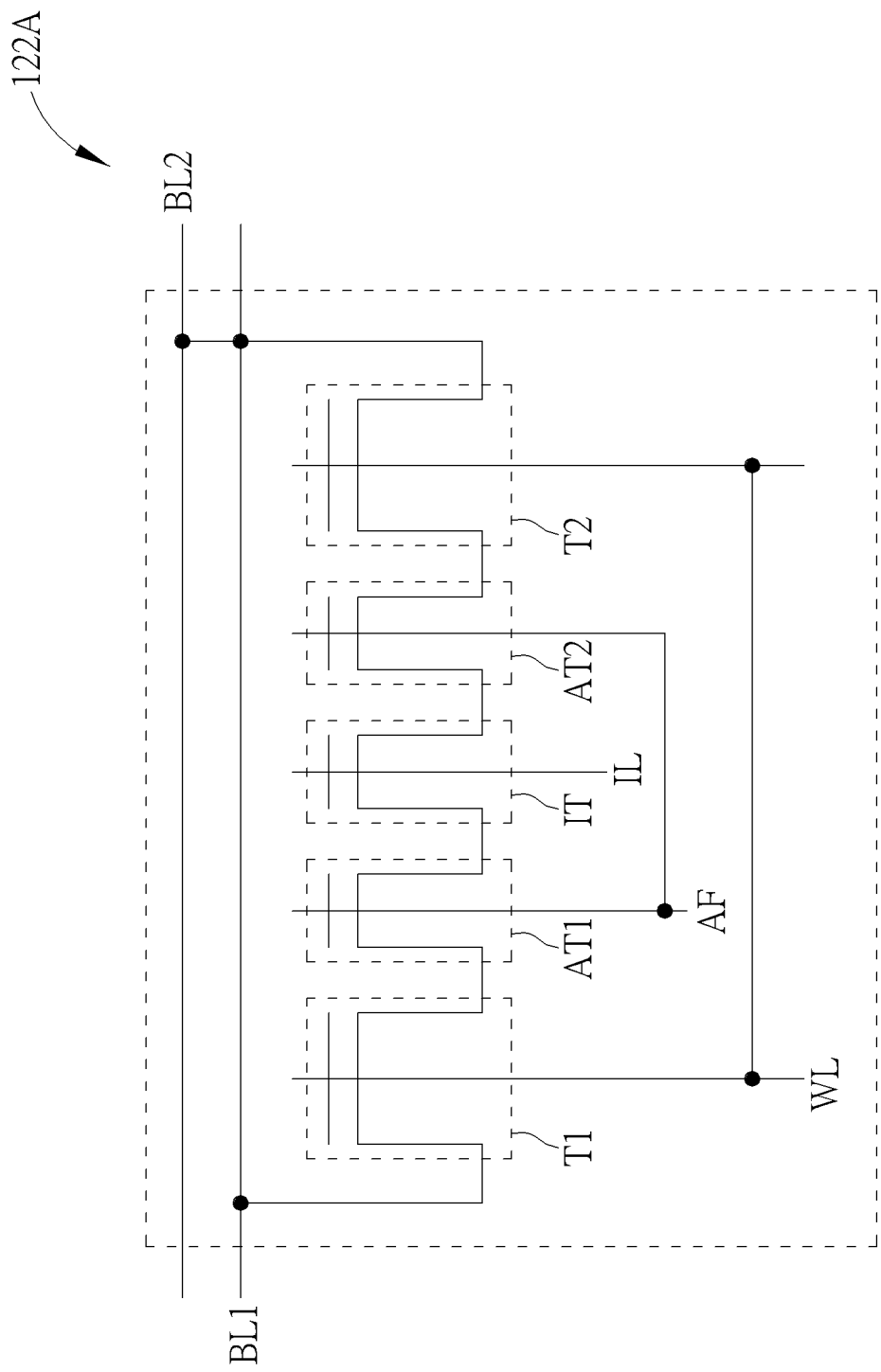
FIG. 2 shows a PUF unit of the PUF device in FIG. 1 according to one embodiment of the present invention.

FIG. 2 shows a PUF unit 122A of the PUF device 122 according to one embodiment of the present invention. The PUF unit 122A includes a first select transistor T1, a second select transistor T2, an isolation transistor IT, a first anti-fuse transistor AT1, and a second anti-fuse transistor AT2. The first select transistor T1 has a first terminal coupled to a first bit line BL1, a second terminal, and a control terminal coupled to a word line WL. The first anti-fuse transistor AT1 has a first terminal coupled to the second terminal of the first select transistor T1, a second terminal, and a control terminal coupled to an anti-fuse control line AF. The second anti-fuse transistor AT2 has a first terminal, a second terminal, and a control terminal coupled to the anti-fuse control line AF. The second select transistor T2 has a first terminal coupled to a second bit line BL2, a second terminal coupled to the first terminal of the second anti-fuse transistor AT2, and a control terminal coupled to the word line WL. The isolation transistor IT has a first terminal coupled to the second terminal of the first anti-fuse transistor AT1, a second terminal coupled to the second terminal of the second anti-fuse transistor AT2, and a control terminal coupled to an isolation control line IL.

During an enroll operation of the PUF unit 122A, the bit lines BL1 and BL2 are at a low voltage, the word line WL is at a high voltage, the isolation control line IL is at the high voltage, and the anti-fuse control line AF is at a program voltage higher than the high voltage. In this case, the isolation transistor IT, and the select transistors T1 and T2 are turned on, so both the low voltage and the program voltage are imposed on the anti-fuse transistors AT1 and AT2. The voltage difference applied on the anti-fuse transistors AT1 and AT2 is high enough to rupture the anti-fuse transistors AT1 and AT2. However, due to the physical characteristic variations caused in the manufacturing process of the anti-fuse transistors AT1 and AT2, one of the anti-fuse transistors AT1 and AT2 is ruptured first, and the first ruptured anti-fuse transistor will relieve the voltage stress, preventing the other anti-fuse transistor from being ruptured. That is, after the enroll operation, the anti-fuse transistors AT1 and AT2 will be at different conditions: one is ruptured, and one is not.

Once the PUF unit 122A is enrolled, the bit data can be read from the bit lines BL1 and BL2 by the read operation. During the read operation, the word line WL is at the high voltage, the isolation control line IL is at the low voltage, and the anti-fuse control line AF is at a read voltage, which can be substantially equal to the high voltage on the word line WL. In this case, the isolation transistor IT is turned off, the select transistors T1 and T2 are turned on, and the anti-fuse transistors AT1 and AT2 will generate currents according to their conditions. That is, the intensity of the currents generated by the anti-fuse transistors AT1 and AT2 is related to whether they are ruptured or not. Therefore, a sensing amplifier may be used to sense the difference between currents on the bit line BL1 and BL2, and the enrolled bit data in the PUF unit 122A can be read.

In FIG. 2, the isolation transistor IT can be turned off during the read operation to prevent the currents generated by the anti-fuse transistors AT1 and AT2 from interfering each other, affecting the accuracy of the reading result. However, in some other embodiments, if the current difference is large enough, the isolation transistor IT can be omitted, and the second terminals of the anti-fuse transistors AT1 and AT2 can be coupled together.

In this case, if the read operations are performed before the enroll operations, the reading results generated by the sense amplifier will be random and may be different every time. With the random key generated without being enrolled in advance, the communication buffer 120 may fail to restore the transmission data D unpredictably from time to time. Consequently, even if the layout of the communication terminal 130 is cloned by the competitor, the communication system 100 will still fail to function normally without performing the enroll operation correctly, which can help to achieve the in-chip anti-counterfeit. Also, to enhance the protection, the first security key SK1 can be generated by the PUF device 122 when the communication buffer 120 receives the first mapping request R1. That is, the first security key SK1 can be registered right after the request to ensure the reliability of the first security key SK1.

In addition, to avoid the redundant operations of repeating mapping requests, the first communication terminal 110 can include a non-volatile memory 112 for storing the first security key SK1, which also helps to reduce the number of times of transmission of the first security key SK1 and protect the first security key SK1 from being hacked by an unauthorized user.

In some embodiments, the first communication terminal 110 can include an encryption logic circuit 114 for manipulating the transmission data D with the first security key SK1 to generate the first encrypted data E1. For example, the encryption logic circuit 114 can perform a bit-wise exclusive OR (XOR) operation on the transmission data D and the first security key SK1 to generate the first encrypted data E1. That is, the first communication terminal 110 can manipulate the transmission data D with the XOR operation. In this case, the communication buffer 120 can also include an decryption logic circuit 124 for performing a bit-wise XOR operation on the first encrypted data E1 and the first security key SK1 to restore the transmission data D.

However, in some other embodiments of the present invention, the first communication terminal 110 may use other reversible algorithms to manipulate the transmission data D with the first security key SK1, and the communication buffer 120 will retrieve the transmission data D correspondently. For example, in some other embodiments, the encryption logic circuit 114 may perform other kinds of encryption logic, including Advanced Encryption Standard (AES), and sequential logic, to generate the encrypted data. For instance, the sequential logic may be defined as a swap logic operation or a shift logic operation. When the encryption logic circuit 114 perform a sequential logic operation (e.g., swap or shift) on the transmission data D, it will swap or shift the data bit of the transmission data D according to the security key SK1 to generate the encrypted data E1. In this case, the communication buffer 120 will restore the transmission data from the encrypted data E1 according to the security key SK1 by reversing the sequential logic operation.

In FIG. 1, the first communication terminal 110 can be a host, and the second communication terminal 130 can be a client. In this case, the communication buffer 120 embedded in the second communication terminal 130 can restore the transmission data D from the first encrypted data E1 for the second communication terminal 130. However, in some other embodiment, the communication buffer 120 can be embedded in the host according to the system requirement.

Figure 3:
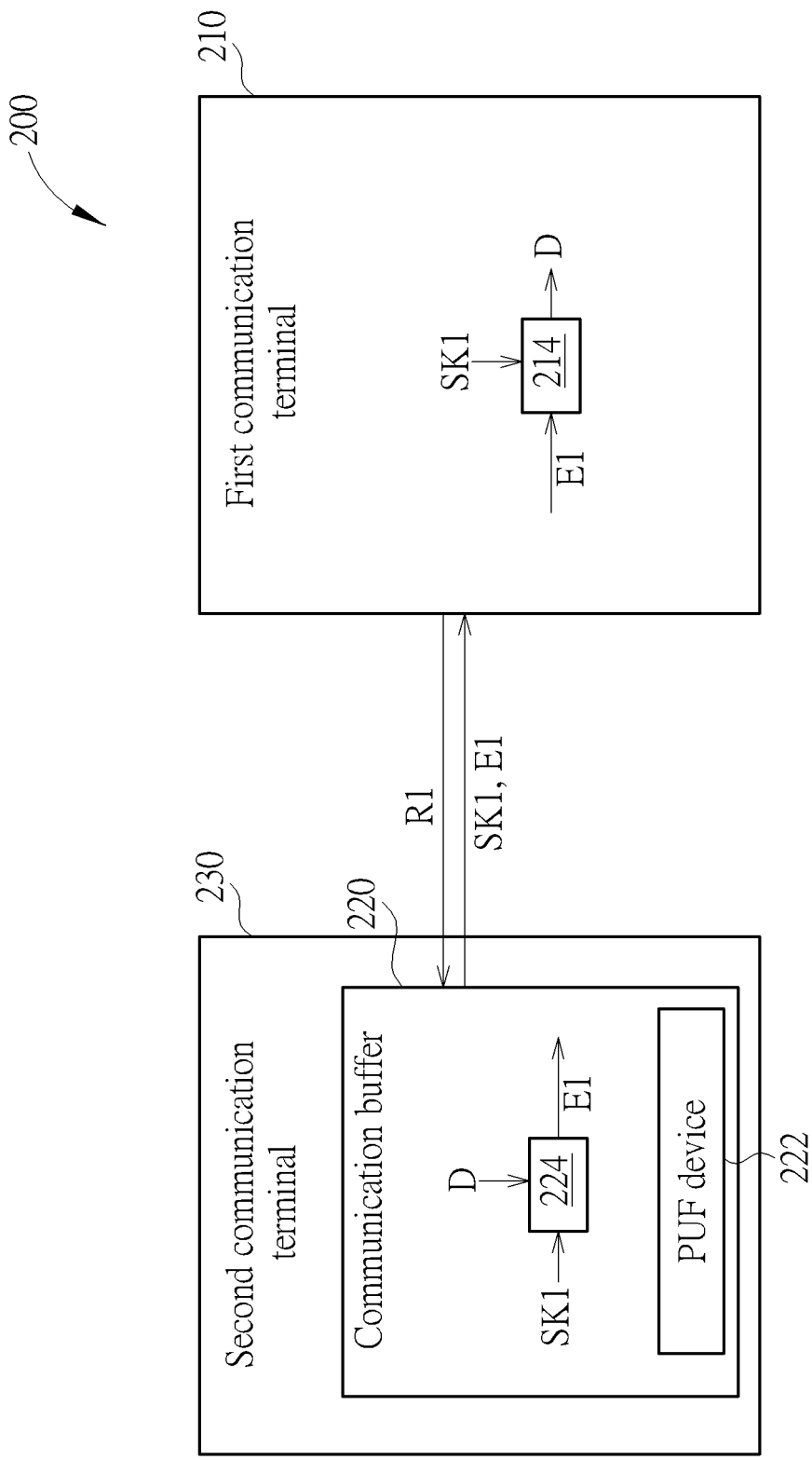
FIG. 3 shows a communication system according to another embodiment of the present invention.

FIG. 3 shows a communication system 200 according to another embodiment of the present invention. The communication system 200 includes a first communication terminal 210, a communication buffer 220, and a second communication terminal 230. In FIG. 3, the first communication terminal 210 can be the client, the second communication terminal 230 can be the host, and the communication buffer 220 can be embedded in the second communication terminal 230.

For example, the second communication terminal 230 can be coupled to the communication buffer 220, and can generate the transmission data D. The communication buffer 220 can provide the security key SK1 generated by the PUF device 222, and can include the encryption logic circuit 224 for manipulating the transmission data D with the security key SK1 to generate the encrypted data E1. For example, the encryption logic circuit 224 can perform the bit-wise XOR operation on the transmission data D and the security key SK1 to generate the encrypted data E1, or the encryption logic circuit 224 can perform the sequential logic operation on the transmission data D according to the security key SK1 to generate the encrypted data E1.

The first communication terminal 210 is coupled to the communication buffer 220, and can transmit a mapping request R1 to the communication buffer 220 to request the communication buffer 220 for the security key SK1. Therefore, when the first communication terminal 210 receives the encrypted data E1, the first communication terminal 210 will be able to restore the transmission data D from the encrypted data E1 according to the security key SK1 with the decryption logic circuit 214, and thus can perform the corresponding function according to the transmission data D. That is, the communication buffer can be embedded to the host terminal or the client terminal according to the system.

Furthermore, in some other embodiments, instead of being embedded to one of the communication terminals, the communication buffer and the communication terminals can be disposed in different chips. In this case, the different communication terminals may use different security keys. In addition, the communication buffer and the communication terminals can be disposed in different blocks of the same chip. In that way, the in-chip anti-counterfeit can be implemented. That is to say, even if a counterfeit chip is cloned by reverse engineering, the counterfeit chip will not function normally without the correct security key.

Figure 4:
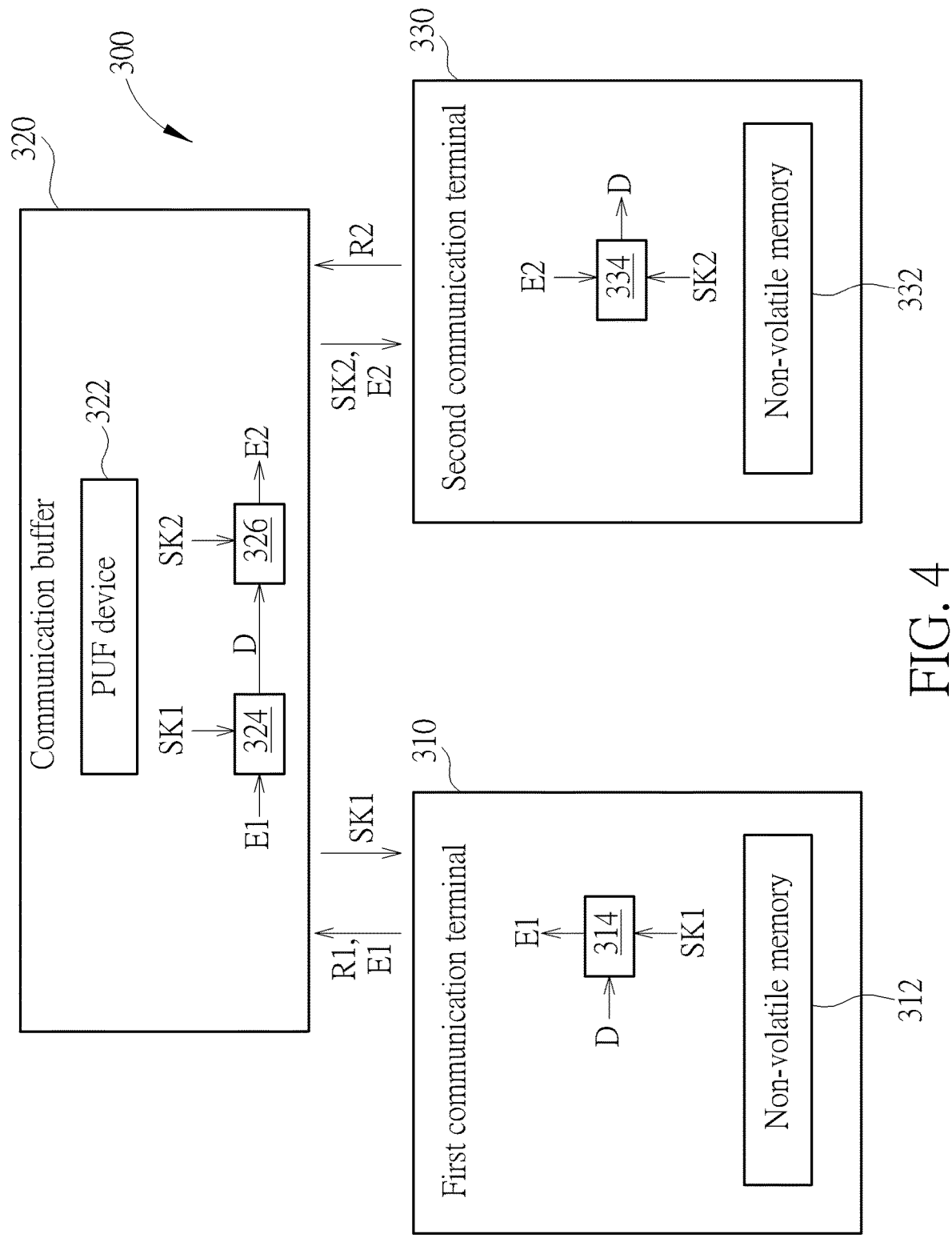
FIG. 4 shows a communication system according to another embodiment of the present invention.

FIG. 4 shows a communication system 300 according to another embodiment of the present invention. The communication system 300 includes a first communication terminal 310, a communication buffer 320, and a second communication terminal 330.

The first communication terminal 310 can use the encryption logic circuit 314 to encrypt the transmission data D with the security key SK1 provided by the communication buffer 320 to generate the first encrypted data E1, and the communication buffer 320 can use the decryption logic circuit 324 to restore the transmission data D from the first encrypted data E1 according to the security key SK1.

Furthermore, the communication buffer 320 can provide a second security key SK2 generated by the PUF device 322, and use another encryption logic circuit 326 to manipulate the transmission data D with the second security key SK2 to generate second encrypted data E2. Afterwards, the communication buffer 320 can transmit the second encrypted data E2 to the second communication terminal 330. The second communication terminal 330 can transmit a second mapping request R2 to the communication buffer 320 to request the communication buffer 320 for the second security key SK2, and restore the transmission data D from the second encrypted data E2 according to the second security key SK2 with the decryption logic circuit 334. Since the transmission data D cannot be retrieved from the encrypted data E1 and E2 without the security keys SK1 and SK2, the communication between the first communication terminal 310 and the second communication terminal 330 can be protected.

In FIG. 4, the first communication terminal 310 can include a non-volatile memory 312 for storing the first security key SK1, and the second communication terminal 330 can include a non-volatile memory 332 for storing the second security key SK2. Furthermore, in the embodiment shown in FIG. 4, the first communication terminal 310, the communication buffer 320, and the second communication terminal 330 can be disposed in different chips or different blocks in the same chip while the communication between different chips or different blocks can be protected by the security keys SK1 and SK2.

With the communication systems 100 to 300, the communication between different blocks or different chips can be protected by encryption with the security key generated by PUF units; therefore, the safety can be enhanced effectively without complicated designs.

Figure 5:
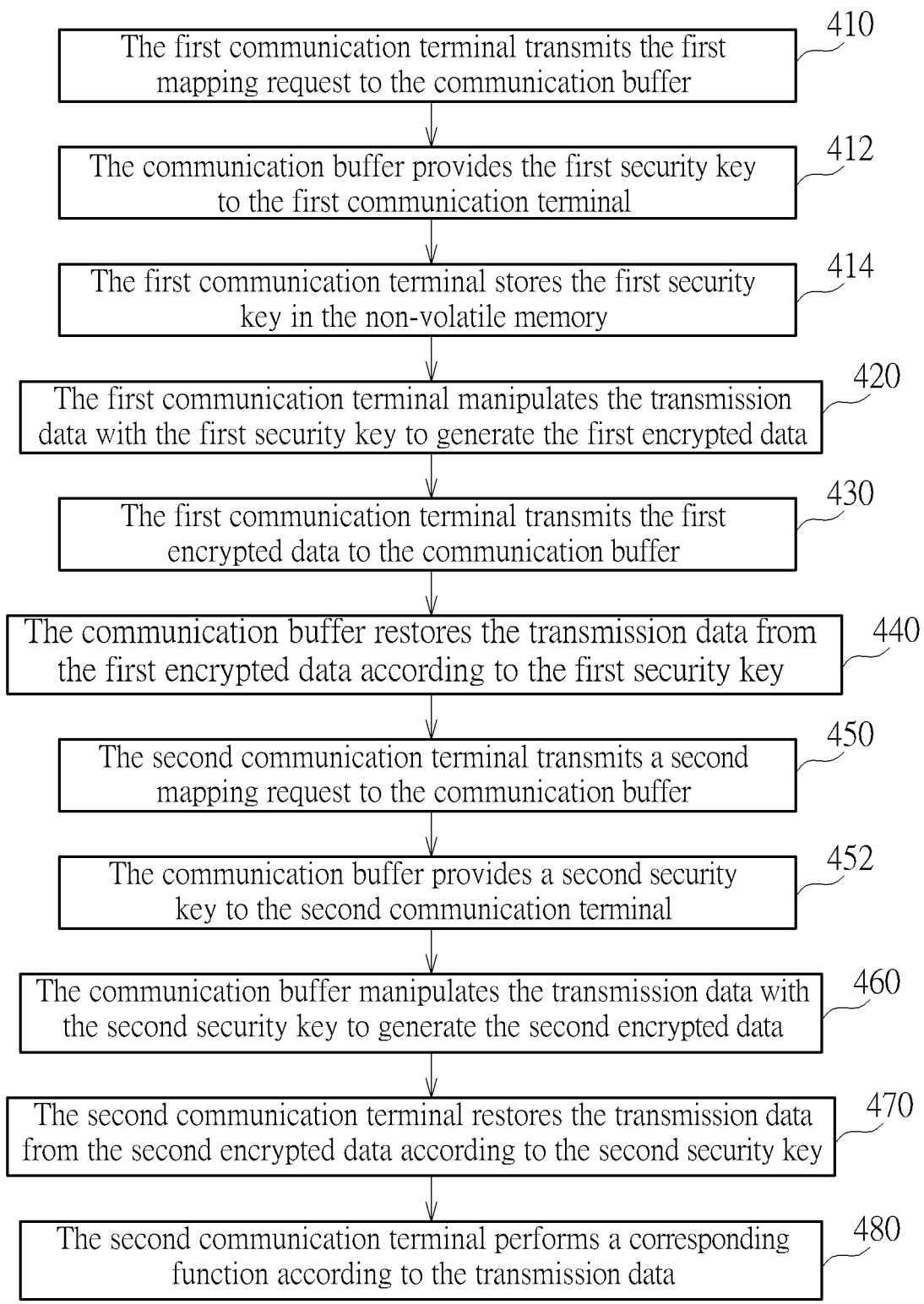
FIG. 5 shows a flow chart of a method for operating the communication system in FIG. 4 according to one embodiment of the present invention.

FIG. 5 shows a flow chart of the method 400 for operating the communication system 300 according to one embodiment of the present invention. The method 400 includes steps S410 to S480 but is not limited to the order shown in FIG. 5.

S410: the first communication terminal 310 transmits the first mapping request R1 to the communication buffer 320;

S412: the communication buffer 320 provides the first security key SK1 generated by the PUF device 322 to the first communication terminal 310;

S414: the first communication terminal 310 stores the first security key SK1 in the non-volatile memory 312;

S420: the first communication terminal 310 manipulates the transmission data D with the first security key SK1 to generate the first encrypted data E1;

S430: the first communication terminal 310 transmits the first encrypted data E1 to the communication buffer 320;

S440: the communication buffer 320 restores the transmission data D from the first encrypted data E1 according to the first security key SK1;

S450: the second communication terminal 330 transmits a second mapping request R2 to the communication buffer 320;

S452: the communication buffer 320 provides a second security key SK2 generated by the PUF device 322 to the second communication terminal 330;

S460: the communication buffer 320 manipulates the transmission data D with the second security key SK2 to generate the second encrypted data E2;

S470: the second communication terminal 330 restores the transmission data D from the second encrypted data E2 according to the second security key SK2; and S480: the second communication terminal 330 performs a corresponding function according to the transmission data D.

In some embodiments, steps S420 and S460 can be performed with the bit-wise XOR operation. Since the XOR operation is reversible, the communication buffer 320 and the second communication terminal 330 can restore the transmission data D in step S440 and S470 with the corresponding security keys SK1 and SK2. However, in some other embodiments, the steps S420 and S460 may adopt other reversible Boolean operations or can be performed with other predetermined rules according to the system requirements.

For example, the first communication terminal 310 may perform the sequential logic operation to swap or shift the data bits in the transmission data D according to the security key SK1 in step S420. In this case, the communication buffer 320 will restore the transmission data D from the first encrypted data E1 according to the first security key SK1 by reversing the sequential logic operation according to the security key SK1 in step S440.

Furthermore, in some embodiments, the communication buffer 320 can be embedded in the first communication terminal 310. In this case, the steps S410 to steps S440 can be skipped since the internal communications between the communication buffer 320 and the first communication terminal 310 is rather safe. Also, in some other embodiments, the communication buffer 320 can be embedded in the second communication terminal 330. In this case, the steps S450 to S470 can be skipped, and the second communication terminal 330 can receive the transmission data from the communication buffer 320 through the internal communications within the same block or the same chip.

In summary, the communication systems and the methods for operating the communication systems provided by the embodiments of the present invention can use the communication buffer to encrypt the transmission data with the security key provided by the PUF device. Since the transmission data cannot be retrieved without the security key, the transmission data transmitted on the IO buses can be protected effectively during the communication process, preventing the critical information from being accessed without authentication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication system comprising:
a communication buffer comprising a physical unclonable function (PUF) device, and the communication buffer being configured to provide a first security key generated by the PUF device, wherein the PUF device comprises a plurality of PUF units each comprising:
   a first select transistor having a first terminal coupled to a first bit line, a second terminal, and a control terminal coupled to a word line;
   a first anti-fuse transistor having a first terminal coupled to the second terminal of the first select transistor, a second terminal, and a control terminal coupled to an anti-fuse control line;
   a second anti-fuse transistor having a first terminal, a second terminal, and a control terminal coupled to the anti-fuse control line; and
   a second select transistor having a first terminal coupled to a second bit line, a second terminal coupled to the first terminal of the second anti-fuse transistor, and a control terminal coupled to the word line;
   wherein during an enroll operation of the PUF unit, the anti-fuse control line is at a program voltage; and
a first communication terminal coupled to the communication buffer, and configured to transmit a first mapping request to the communication buffer to ask for the first security key, manipulate transmission data with the first security key to generate first encrypted data, and transmit the first encrypted data to the communication buffer;
wherein the communication buffer is further configured to restore the transmission data from the first encrypted data according to the first security key.

2. The communication system of claim 1, wherein:
the first security key is generated by the PUF device when the communication buffer receives the first mapping request.

3. The communication system of claim 1, wherein:
the first communication terminal performs a bit-wise exclusive OR (XOR) operation on the transmission data and the first security key to generate the first encrypted data; and
the communication buffer performs a bit-wise XOR operation on the first encrypted data and the first security key to restore the transmission data.

4. The communication system of claim 1, wherein:
the first communication terminal performs a sequential logic operation on the transmission data to swap or shift data bits of the transmission data to generate the first encrypted data according to the first security key.

5. The communication system of claim 1, further comprising:
a second communication terminal coupled to the communication buffer, and configured to receive the transmission data from the communication buffer and perform a corresponding function according to the transmission data.

6. The communication system of claim 5, wherein the communication buffer is embedded in the second communication terminal.

7. The communication system of claim 1, further comprising:
a second communication terminal coupled to the communication buffer;
wherein:
the communication buffer is further configured to provide a second security key generated by the PUF device, manipulate the transmission data with the second security key to generate second encrypted data, and transmit the second encrypted data to the second communication terminal; and
the second communication terminal is configured to transmit a second mapping request to the communication buffer to ask for the second security key, and restore the transmission data from the second encrypted data according to the second security key.

8. The communication system of claim 7, wherein the first communication terminal, the communication buffer, and the second communication terminal are disposed in different chips or in different blocks within a same chip.

9. The communication system of claim 1, wherein the first communication terminal comprises a non-volatile memory configured to store the first security key.

10. The communication system of claim 1, wherein each of the plurality of PUF units further comprises an isolation transistor having a first terminal coupled to the second terminal of the first anti-fuse transistor, a second terminal coupled to the second terminal of the second anti-fuse transistor, and a control terminal coupled to an isolation control line;
wherein the isolation transistor is turned on during a enroll operation, and is turned off during a read operation.

11. A communication system comprising:
a communication buffer comprising a physical unclonable function (PUF) device, and the communication buffer being configured to provide a security key generated by the PUF device, and manipulate transmission data with the security key to generate encrypted data, wherein the PUF device comprises a plurality of PUF units each comprising:
a first select transistor having a first terminal coupled to a first bit line, a second terminal, and a control terminal coupled to a word line;
a first anti-fuse transistor having a first terminal coupled to the second terminal of the first select transistor, a second terminal, and a control terminal coupled to an anti-fuse control line;
a second anti-fuse transistor having a first terminal, a second terminal, and a control terminal coupled to the anti-fuse control line; and
a second select transistor having a first terminal coupled to a second bit line, a second terminal coupled to the first terminal of the second anti-fuse transistor, and a control terminal coupled to the word line;
wherein during an enroll operation of the PUF unit, the anti-fuse control line is at a program voltage; and
a first communication terminal coupled to the communication buffer, and configured to transmit a mapping request to the communication buffer to ask for the security key, restore the transmission data from the encrypted data according to the security key, and perform a corresponding function according to the transmission data.

12. The communication system of claim 11, wherein:
the security key is generated by the PUF device when the communication buffer receives the mapping request.

13. The communication system of claim 11, wherein:
the communication buffer performs a bit-wise exclusive OR (XOR) operation on the transmission data and the security key to generate the encrypted data; and
the first communication terminal performs a bit-wise XOR operation on the encrypted data and the security key to restore the transmission data.

14. The communication system of claim 11, wherein:
the communication buffer performs a sequential logic operation on the transmission data to swap or shift data bits of the transmission data to generate the encrypted data according to the security key.

15. The communication system of claim 11, wherein the first communication terminal comprises a non-volatile memory configured to store the security key.

16. The communication system of claim 11, further comprising:
a second communication terminal coupled to the communication buffer, and configured to generate the transmission data;
wherein the communication buffer is embedded in the second communication terminal.

17. A method for operating a communication system, the communication system comprising a communication buffer and a first communication terminal, and the method comprising:
the first communication terminal transmitting a first mapping request to the communication buffer;
the communication buffer providing a first security key generated by a PUF device in the communication buffer to the first communication terminal;
the first communication terminal manipulating transmission data with the first security key to generate first encrypted data;
the first communication terminal transmitting the first encrypted data to the communication buffer; and
the communication buffer restoring the transmission data according to the first encrypted data and the first security key; and
wherein the communication system further comprises a second communication terminal, and the method further comprises:
the second communication terminal transmitting a second mapping request to the communication buffer;
the communication buffer providing a second security key generated by the PUF device to the second communication terminal;
the communication buffer manipulating the transmission data with the second security key to generate second encrypted data; and
the second communication terminal restoring the second encrypted data to the transmission data according to the second security key.

18. The method of claim 17, wherein:
the first communication terminal manipulating the transmission data with the first security key to generate the first encrypted data comprises the first communication terminal performing a bit-wise exclusive OR (XOR) operation on the transmission data and the first security key to generate the first encrypted data; and
the communication buffer restoring the transmission data according to the first encrypted data and the first security key comprises the communication buffer performing a bit-wise XOR operation on the first encrypted data and the first security key to restore the transmission data.

19. The method of claim 17, wherein the communication system further comprises a second communication terminal, and the method further comprises:
the second communication terminal receiving the transmission data from the communication terminal; and
the second communication terminal performing a corresponding function according to the transmission data.

20. The method of claim 17, wherein the first communication terminal further comprises a non-volatile memory, and the method further comprises the first communication terminal storing the first security key in the non-volatile memory.

21. The method of claim 17, wherein:
the first communication terminal manipulating the transmission data with the first security key to generate the first encrypted data comprises the first communication terminal performing a sequential logic operation on the transmission data to swap or shift data bits of the transmission data to generate the first encrypted data according to the first security key.

* * * * *